United States Patent Office 3,553,198
Patented Jan. 5, 1971

3,553,198
2,4,6-SUBSTITUTED-5-ARYLSULFONYL-PYRIMIDINES
Arthur A. Santilli, Havertown, Pa., Thomas S. Osdene, Richmond, Va., and Scott J. Childress, Philadelphia, Pa., assignors to American Home Products Corporation, New York, N.Y., a corporation of Delaware
No Drawing. Continuation-in-part of application Ser. No. 519,193, Jan. 7, 1966. This application Mar. 7, 1968, Ser. No. 715,475
Int. Cl. C07d 51/42
U.S. Cl. 260—239.75
8 Claims

ABSTRACT OF THE DISCLOSURE 4-substituted-5-aryl-sulfonylpyrimidines, optionally substituted at positions 2 and 6, are prepared by condensing an amidine or substituted amidine with an appropriately-substituted-α-arylsulfonyl-β-lower alkoxy-acrylonitrile or a lower alkyl-α-arylsulfonyl-β-lower alkoxy-acrylyl ketone in the presence of an alkaline condensation agent. The compounds of this invention have cardiovascular activity, especially blood-pressure lowering activity.

---

This application is a continuation-in-part of copending application Ser. No. 519,193, filed Jan. 7, 1966, now abandoned.

This invention relates to new and useful arylsulfonyl-pyrimidines. In particular, the present invention is concerned with 2,4,6 - substituted-5-arylsulfonylpyrimidines having pharmacodynamic activity.

DESCRIPTION OF THE INVENTION

The novel compounds of this invention are represented by Formula I:

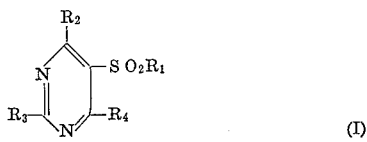

wherein:

$R_1$ is an aryl moiety, such as, phenyl, aminophenyl, acetamidophenyl, halophenyl, lower alkylphenyl, lower alkoxyphenyl, lower alkylaminophenyl, di(lower)alkylaminophenyl, di(lower)alkylamino(lower)alkylaminophenyl, piperidylphenyl, N - (lower)alkylpiperazinylphenyl, naphthyl, halonaphthyl, lower alkylnaphthyl or lower alkoxynaphthyl;

$R_2$ is amino, acetamido, lower alkyl, phenyl, halophenyl, lower alkylphenyl or lower alkoxyphenyl;

$R_3$ is hydrogen, amino, acetamido, lower alkyl, lower alkylmercapto, phenyl, halophenyl, lower alkylphenyl or lower alkoxyphenyl; and $R_4$ is hydrogen or lower alkyl. Illustrative of such compounds are: 4-amino - 2 - (m-chlorophenyl)-5-(m-tolylsulfonyl)-pyrimidine, 2,4 - diamino - 5 - (2 - naphthylsulfonyl)pyrimidine and 2,4 - diamino - 5 - [p-(4-methyl-1-piperazinyl)phenylsulfonyl]pyrimidine.

When used herein and in the appended claims, the term "lower alkyl" and derivations thereof such as "lower alkoxy" and "lower alkyl mercapto" contemplates groups including from about 1 to about 7 carbon atoms, straight chain and branched. The term "halo" includes chloro, bromo, fluoro and iodo. An important sub-generic aspect of this invention comprises compounds of Formula I wherein $R_2$ is amino and $R_4$ is hydrogen.

In accord with the process aspect of the present invention, the novel pyrimidine compounds of this invention may be prepared by the reaction of a sulfone selected from the group consisting of those having the formulae:

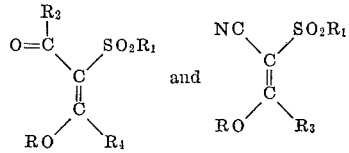

wherein $R_1$, $R_2$ and $R_4$ are defined as above and R is lower alkyl, with a compound of the formula:

wherein $R_3$ is as defined above. In practicing the process outlined above, a substantially equimolar mixture of the reactants is heated, in an anhydrous alkanol, in the presence of an equivalent amount of an alkaline condensation agent at a temperature from about 50° C. to about 120° C. for a period of from about one hour to about forty-eight hours. Preferably, this reaction is conducted in absolute methanol or ethanol, in the presence of sodium metal, at the reflux temperature of the reaction mixture, for a period of about one to five hours.

These time and temperature ranges are not critical and simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time. By anhydrous alkanol as employed herein is meant a water-free organic alcohol containing from one to seven carbon atoms, such as methanol, butanol and heptanol. The amount of alkanol solvent used is not critical, it being only necessary to use sufficient solvent to provide a reaction medium for the reactants.

After the reaction is complete, the reaction mixture is cooled, and the product is obtained by conventional methods, for example filtration and recrystallization from a suitable solvent, such as, alkanols and alkanes.

Many of the reactants employed in the process of this invention are known compounds which are available from commercial sources, while the remainder can be prepared in accordance with standard organic procedures well known to those skilled in the art. Procedures for the preparation of many of the reactants of the present invention are exemplified in detail in the hereinafter listed examples.

The compounds of Formula I of this invention have demonstrated pharmacological activity. In particular they have been found to exert a hypotensive action on the cardiovascular system when tested under standard and accepted pharmacological procedures in animals, such as mice and rats. They are, therefore, deemed to possess utility in experimental and comparative pharmacology and are of value to treat conditions in animals, such as valuable domestic animals, and in laboratory animals, such as mice, rats and the like, responsive to treatment with cardiovascular agents, such as the need to lower blood pressure.

Compounds of Formula I of this invention may be administered either alone or in combination with other pharmacologically-active ingredients. Whether singly or in combination, they may be used in the form of solid composition combined, if desired, with extenders or carriers that are relatively nontoxic or inert. They may be put into tablet, capsule or powder form. On the other hand, they may be administered in liquid form as a suspension or solution in a suitable vehicle for parenteral use. As will be described hereinafter, compounds of Formula I of this invention demonstrate useful pharmacological action as hypotensive agents in rats and dogs at dosages of the order of 20, 60, 75 and 100 mg./kg.

The following examples are given by way of illustration and are not to be construed as limitations of this invention, variations of which are possible without departing from the scope and spirit thereof.

EXAMPLE I

To a stirring solution of 13.8 g. of sodium metal in 500 ml. of absolute ethanol, there is added 74.5 g. of m-toluenethiol. The reaction mixture is then cooled to 10° C., and 45.3 g. of chloroacetonitrile is added dropwise over the course of one-half hour. The temperature of the reaction mixture is then raised to room temperature with stirring for twelve hours. Thereafter, the mixture is filtered under suction and after removal of the filtrate solvent by vacuum evaporation, a portion of the oily residue is distilled in vacuo. The product is m-tolylthioacetonitrile, B.P. 100° C./0.05 mm.

*Analysis.*—Calcd. for $C_9H_9SN$ (percent): C, 66.24; H, 5.56; N, 8.58; S, 19.61. Found (percent): C, 66.46; H, 5.35; N, 8.74; S, 19.6.

To 20 g. of the above prepared m-tolylthioacetonitrile in 40 g. of glacial acetic acid, there is added 45 ml. of a 25 percent hydrogen peroxide solution. The reaction mixture is heated at 95° C. for one hour, then cold water is added thereto until precipitation is complete. Thereafter, the product is recrystallized from ether to yield m-tolylsulfonylacetonitrile.

To a flask equipped with a stirrer and distillation head, there is added 4.1 g. of the above prepared m-tolylsulfonylacetonitrile, 9.6 g. of triethyl orthoformate and 2 ml. of glacial acetic acid. The reaction mixture is refluxed for 1½ hours, a total of 4 ml. of distillate is collected and the excess triethyl orthoformate is removed by evaporation. The residual oil crystallizes on cooling, is recrystallized from benzene-cyclohexane and then ethanol to yield 3 - ethoxy - (m-tolysulfonyl)acrylonitrile, M.P. 74–75° C.

*Analysis.*—Calcd. for $C_{12}H_{13}O_3NB$ (percent): C, 57.37; N, 5.22; N, 5.58; S, 12.74. Found (percent): C, 57.37; H, 5.19; N, 5.54; S, 12.6.

To a stirring solution of 0.83 g. of sodium metal in 75 ml. of absolute ethanol, there are added 6 g. of m-chlorobenzamidine hydrochloride and 7.9 g. of 3-ethoxy-2-(m-tolylsulfonyl)-acrylonitrile. The reaction mixture is then heated to reflux for two hours and cooled. Filtration under suction affords 9.2 g. of a solid, M.P. 169–171° C. Subsequently, this solid is triturated with 50 ml. of chilled water, refiltered, washed with petroleum ether and recrystallized from aqueous ethanol to afford 5.4 g. of 4-amino - 2 - (m-chlorophenyl)-5-(m-tolylsulfonyl)pyrimidine, 171–172° C.

*Analysis.*—Calcd. for $C_{17}H_{14}N_3SO_2Cl$ (percent): C, 56.74; H, 3.92; N, 11.68; Cl, 9.85; S, 8.91. Found (percent): C, 56.52; H, 3.73; N, 11.42; Cl, 9.8; S, 8.6.

In a similar manner, 4-amino-2-(p-bromophenyl)-5-(p-butylphenylsulfonyl)pyrimidine and 4 - amino - 2 - (m-iodophenyl)-5-(p-methoxyphenylsulfonyl)pyrimidine are synthesized.

EXAMPLE II

The procedure of Example I is repeated, utilizing the appropriate starting compounds, to produce the hereinafter listed pyrimidines:

4-amino-5-(p-bromophenylsulfonyl)-2-ethylpyrimidine;
4-amino-2-hexyl-5-(m-iodophenylsulfonyl)pyrimidine;
4-amino-2-(p-fluorophenyl)-5-phenylsulfonylpyrimidine;
4-amino-5-(p-fluorophenylsulfonyl)-2-methylpyrimidine; and
4-amino-5-(p-ethoxyphenylsulfonyl)-2-(p-tolyl)pyrimidine.

EXAMPLE III

In a 250 ml. flask equipped with a magnetic stirrer and distillation head are placed 32.8 g. of p-chlorophenylsulfonylacetonitrile, 71.6 g. of triethyl orthoformate and 1 ml. of glacial acetic acid. The reaction mixture is heated to 140° C. for 3½ hours, during which time 27 ml. of ethanol are collected. The excess triethyl orthoformate is then removed on a rotary evaporator in vacuo. On cooling and scratching the residual oil, there is obtained 42 g. of a solid which when recrystallized from ethanol yields 2 - (p - chlorophenylsulfonyl)-3-ethoxyacrylonitrile, M.P. 121.5–122° C.

*Analysis.*—Calcd. for $C_{11}H_{10}NSO_3Cl$ (percent): C, 48.62; H, 3.71; N, 5.16; Cl, 13.05; S, 11.80. Found (percent): C, 48.91; H, 3.63; N, 5.04; Cl, 13.0; S, 11.7.

To a stirring solution of 0.51 g. of sodium metal in 50 ml. of absolute ethanol, there is added 2.1 g. of formamidine acetate followed by 5.44 g. of the above prepared 2-(p-chlorophenylsulfonyl)-3-ethoxyacrylonitrile and the reaction mixture is refluxed for 1 hour. Upon cooling, the precipitated solid (3.8 g.) is triturated with 30 ml. of water and the mixture is filtered under suction. The product (3.0 g.) is then recrystallized from ethanol to yield 4-amino-5-(p-chlorophenylsulfonyl)pyrimidine, M.P. 178–179° C.

*Analysis.*—Calcd. for $C_{10}H_8N_3SO_2Cl$ (percent): C, 44.53; H, 2.99; N, 15.58; Cl, 13.15; S, 11.89. Found (percent): C, 44.64; H, 2.93; N, 15.29; Cl, 13.0; S, 12.1.

Similarly, 4 - amino - 5 - (p-bromophenylsulfonyl)-6-propylpyrimidine is synthesized.

EXAMPLE IV

In a 500 ml. flask equipped with a magnetic stirrer and distillation head are placed 65.6 g. of p-hexylphenylsulfonylacetonitrile, 145 g. of triethyl orthoformate and 3 ml. of glacial acetic acid. The reaction mixture is heated to 120° C. for four hours and the excess triethyl orthoformate is then removed on a rotary evaporator in vacuo. On cooling and scratching the residual oil, there is obtained a crystalline solid which is recrystallized from ethanol to yield 3 - ethoxy - 2 - (p-hexylphenylsulfonyl) acrylonitrile.

To a stirring solution of 1.0 g. of potassium metal in 100 ml. of absolute ethanol, there is added 4.2 g. of formamidine acetate followed by 105 g. of the above prepared 3 - ethoxy - 2-(p-hexylphenylsulfonyl)acrylonitrile and the mixture is refluxed for one hour. Upon cooling, the precipitated solid is triturated with 30 ml. of water and the mixture is filtered. The product is then recrystallized from ethanol to yield 4-amino-5-(p-hexylphenylsulfonyl) pyrimidine.

In the same manner, 4 - amino - 5-(p-ethylphenylsulfonyl) - 6 - methylpyrimidine and 4-amino-5-(p-propylphenylsulfonyl)pyrimidine are produced.

EXAMPLE V

To 25 ml. of a 30 percent ethanolic ammonia solution, there is added 5.4 g. of 2-(p-chlorophenylsulfonyl)-3-ethoxyacrylonitrile and the reaction mixture is heated for five minutes at 100° C. The precipitate solid is separated by filtration and recrystallized from aqueous ethanol. In this manner, is obtained 3-amino-2-(p-chlorophenylsulfonyl)acrylonitrile, M.P. 215–216° C.

*Analysis.*—Calcd. for $C_9H_7N_2SO_2Cl$ (percent): C, 44.54; H, 2.91; N, 11.54; Cl, 14.61; S, 13.21. Found (percent): C, 44.68; H, 2.89; N, 11.78; Cl, 14.7; S, 13.1.

To a solution of 0.23 g. of sodium metal in 30 ml. of absolute ethanol, there is added 0.78 g. of thioacetamide, followed by 2.4 g. of the above prepared 3-amino-2-(p-chlorophenylsulfonyl)-acrylonitrile and the mixture is refluxed with stirring for one hour. The hot solution is then filtered and on cooling, there precipitates 0.8 g. of material, M.P. 187–189° C. Recrystallization from ethanol affords 4 - amino - 5-(p-chlorophenylsulfonyl)-2-methylpyrimidine, M.P. 191–192° C.

*Analysis.*—Calcd. for $C_{11}H_{10}N_3SO_2Cl$ (percent): C, 46.56; H, 3.55; N, 14.81; S, 11.30. Found (percent) C, 46.20; H, 3.40; N, 14.84; S, 11.36.

EXAMPLE VI

To 50 ml. of a 25 percent ethanolic ammonia solution, there is added 10.8 g. of 3-ethoxy-2-(N-methylsulfanilyl)acrylonitrile and the reaction mixture is then heated to 100° C. for 15 minutes. The precipitated solid is separated by filtration and recrystallized from aqueous methanol. In this manner, is obtained 3-amino-2-(N-methylsulfanilyl)acrylonitrile.

To a solution of 0.52 g. of sodium ethoxide in 50 ml. of absolute ethanol, there is added 1.5 g. of thioacetamide, followed by 5.2 g. of the above prepared 3-amino-2-(N-methylsulfanilyl)-acrylonitrile and the mixture is refluxed with stirring for two hours. The hot solution is then filtered and, on cooling a precipitate develops which is recrystallized from ethanol to afford 4-amino-2-methyl-5-(N-methylsulfanilyl)pyrimidine.

Similarly, 4 - amino - 5-(N-amylsulfanilyl)-2-methylpyrimidine and 4 - amino - 2-ethyl-5-(N-ethylsulfanilyl)pyrimidine are synthesized.

EXAMPLE VII

A mixture of 9.3 g. of 3-(p-chlorophenylsulfonyl)-propan-2-one, 18.4 g. of triethyl orthoformate and 3 ml. of glacial acetic acid is refluxed for one hour. The ethanol which forms is removed by distillation and the excess triethyl orthoformate is removed on a rotary evaporator in vacuo. On cooling, 12 g. of residue crystallizes, which is recrystallized from ethanol to afford 3-(p-chlorophenylsulfonyl)-4-ethoxy-3-buten-2-one, M.P. 112–113° C.

*Analysis.*—Calcd. for $C_{12}H_{13}SO_4Cl$ (percent): C, 49.91; H, 4.54; Cl, 12.28; S, 11.11. Found (percent): C, 50.00; H, 4.62; Cl, 12.5; S, 11.1.

A stirring mixture of 3.47 g. of the above prepared 3-(p-chlorophenyl) - 4 - ethoxy-3-buten-2-one, 1.089 g. of guanidine carbonate and 30 ml. of absolute ethanol is refluxed for seven hours and then allowed to stand overnight at ambient temperatures. The reaction mixture is then cooled and filtered. The solid residue (2.4 g.) is then recrystallized from ethanol to yield 1.8 g. of 2-amino-5-(p-chlorophenylsulfonyl)-4-methylpyrimidine.

*Analysis.*—Calcd. for $C_{11}H_{10}N_3SO_2Cl$ (percent): C, 46.56; H, 3.55; N, 14.81; Cl, 12.50; S, 11.30. Found (percent): C, 46.52; H, 3.25; N, 14.55; Cl, 12.5; S, 10.7.

In a similar manner, 2-amino-5-(p-bromophenylsulfonyl)-4-ethylpyrimidine and 2-amino-4-butyl-5-phenylsulfonylpyrimidine are produced.

EXAMPLE VIII

In a 250 ml. flask equipped with a magnetic stirrer and distillation head are placed 32.8 g. of p-chlorophenylsulfonyl-acetonitrile, 71.6 g. of triethyl orthoformate and 1 ml. of glacial acetic acid. The reaction mixture is heated to 140° C. for 3½ hours, during which time 27 ml. of ethanol are collected. The excess triethyl orthoformate is removed on a rotary evaporator in vacuo. On cooling and scratching the residual oil, there is obtained 42 g. of a solid which when recrystallized from ethanol yields 2 - (p-chlorophenylsulfonyl)-3-ethoxyacrylonitrile, M.P. 121.5–122° C.

*Analysis.*—Calcd. for $C_{11}H_{10}NSO_3Cl$ (percent): C, 48.62; H, 3.71; N, 5.16; Cl, 13.05; S, 11.80. Found (percent): C, 48.91; H, 3.63; N, 5.04; Cl, 13.0; S, 11.7.

To a stirring solution of 0.39 g. of sodium in 30 ml. of absolute ethanol, there is added 1.84 g. of N-butyramidine hydrochloride followed by 4.07 g. of the above prepared 2-(p-chlorophenylsulfonyl)-3-ethoxyacrylonitrile and the reaction mixture is heated under reflux for one hour and then cooled. The resulting precipitate is then washed with 25 ml. of water. The residue (4.1 g.) is recrystallized from methanol affording 4-amino-5-(p-chlorophenylsulfonyl)-2-propylpyrimidine, M.P. 157–158° C.

*Analysis.*—Calcd. for $C_{13}H_{14}N_3SO_2Cl$ (percent): C, 50.08; H, 4.53; N, 13.48; Cl, 11.37; S, 10.28. Found (percent): C, 50.01; H, 4.42; N, 13.21; Cl, 11.43; S, 10.2.

EXAMPLE IX

To a stirring solution of 0.32 g. in 30 ml. of absolute ethanol, there is added 3.27 g. of S-methylisothiourea hydroiodide followed by 4.07 g. of 2-(p-chlorophenylsolfonyl)-3-ethoxyacrylonitrile (as prepared in Example VIII). The reation is refluxed for two hours and then allowed to stand overnight at room temperature. The crystalline solid (3 g). which precipitates is washed with water to remove sodium chloride, leaving a 2.4 g. residue, M.P. 180–182° C. Recrystallization from benzene affords 2.0 g. of 4-amino-5-(p-chlorophenylsulfonyl)-2-methylmercaptopyrimidine, M.P. 182–183° C.

*Analysis.*—Calcd. for $C_{11}H_{10}N_3S_2O_2Cl$ (percent): C, 41.84; H, 3.19; N, 13.31; Cl, 11.23; S, 20.31. Found (percent): C, 42.21; H, 3.08; N, 13.28; Cl, 11.3; S, 19.6.

EXAMPLE X

In a 250 ml. flask equipped with a magnetic stirrer and distillation head are placed 32.8 g. of p-chlorophenylsulfonylacetronitrile, 71.6 g. of triethyl orthoformate and 1 ml. of glacial acetic acid. The reaction mixture is heated to 140° C. for 3½ hours, during which time 27 ml. of ethanol are collected. The excess triethyl orthoformate is removed on a rotary evaporator in vacuo. On cooling and scratching the residual oil, there is obtained 42 g. of a solid which when recrystallized from ethanol yields 2-(p-chlorophenylsulfonyl) - 3 - ethoxyacrylonitrile, M.P. 121.5–122° C.

*Analysis.*—Calcd. for $C_{11}H_{10}NSO_3Cl$ (percent): C, 48.62; H, 3.71; N, 5.16; Cl, 13.05; S, 11.80. Found (percent): C, 48.91; H, 3.63; N, 5.04; Cl, 13.0; S, 11.7.

To a stirring solution of 0.39 g. of sodium metal in 30 ml. of absolute ethanol, there is added 2.35 g. of benzamidine hydrochloride followed by 4.07 g. of 2-(p-chlorophenylsulfonyl)-3-ethoxyacrylonitrile. The mixture is refluxed for two hours, cooled in ice, and the resulting crystalline precipitate is washed with water. The residual solid (4.3 g.), M.P. 222–223° C., is recrystallized from ethanol to afford 3.8 g. of 4-amino-5-(p-chlorophenylsulfonyl)-2-phenylpyrimidine, M.P. 220–221° C.

*Analysis.*—Calcd. for $C_{16}H_{12}N_3SO_2Cl$ (percent): C, 55.57; H, 3.50; N, 12.15; Cl, 10.25; S, 9.27. Found (percent): C, 55.33; H, 3.20; N, 12.49; Cl, 10.3; S, 9.5.

EXAMPLE XI

The procedure of Examples I to X is repeated reactting the appropriate starting compounds to produce the following pyrimidines:

4-amino-5-(N,N-dimethylsulfanilyl)-2-(p-propylphenyl)-pyrimidine;
2-(p-amylphenyl)-5-phenylsulfonyl-4-propylpyrimidine;
2-(n-methoxyphenoyl)-4-methyl-5-phenyl-sulfonylpyrimidine;
4-amino-5-(N,N-diethylsulfanilyl)pyrimidine; and
4-amino-2-(o-ethoxyphenyl)-5-phenylsulfonylpyrimidine.

EXAMPLE XII

A mixture of 15.0 g. of α-phenylsulfonylacetophenone, 34.6 g. of triethyl orthoformate and 2 ml. of glacial acetic acid is heated to 150° C. for three hours. Thereafter, the reaction mixture is cooled in ice and the precipitated solid is recrystallized from ethanol to afford 3-ethoxy-2-phenylsulfonylacrylophenone.

To a stirring solution of 0.46 g. of sodium in 35 ml. of absolute ethanol, there are added 1.72 g. of guanidine hydrochloride and 4.57 g. of the above prepared 3-ethoxy-2-phenylsulfonylacrylophenone. The reaction mixture is then refluxed for one hour and cooled. The precipitate is recrystallized from ethanol to yield 2-amino-5-phenyl-sulfonyl-4-phenylpyrimidine.

In a similar manner, the following compounds are prepared:

2-amino-4-(p-chlorophenyl)-5-phenylsulfonylpyrimidine;
2-amino-4-(p-tolyl)-5-(p-tolylsulfonyl)pyrimidine;
2-amino-4-(p-heptoxyphenyl)-5-phenylsulfonylpyrimidine;
2-amino-4-(p-ethoxyphenyl)-5-phenylsulfonylpyrimidine; and
2-amino-4-(m-methoxyphenyl)-5-phenylsulfonylpyrimidine.

EXAMPLE XIII

To a stirring solution of 0.90 g. of sodium methoxide in 60 ml. of absolute methanol, there is added 2.8 g. of guanidine hydrochloride, followed by 9.5 g. of 3-ethoxy-2-(N-[3 - dimethylamino)propyl]sulfanilyl)acrylonitrile. The reaction mixture is heated to 60° C. for twelve hours and then filtered under suction. After washing this material with 125 ml. of water, it is recrystallized from dimethylacetamide to yield 2,4-diamino-5-(N-[3-(dimethylamino)propyl]sulfanilyl)pyrimidine.

EXAMPLE XIV

To a stirring solution of 0.39 g. of sodium metal in 30 ml. of absolute ethanol, there is added 1.43 g. of guanidine hydrochloride followed by 4.07 g. of 2-(p-chlorophenylsulfonyl)-3-ethoxyacrylonitrile. The reaction mixture is refluxed for four hours and then filtered under suction. The solid which is collected amounts to 4.2 g. After washing this material with 50 ml. of water, there remains 4.0 g. of product, M.P. 259–262° C. Recrystallization from aqueous N,N-dimethylformamide affords 3.6 g. of 2,4-diamino-5-(p-chlorophenylsulfonyl)pyrimidine, M.P. 262–263° C.

*Analysis.*—Calcd. for $C_{10}H_9N_4SO_2Cl$ (percent: C, 42.18; H, 3.19; N, 19.68; Cl, 12.45; S, 11.26. Found (percent): C, 42.25; H, 3.16; N, 19.88; Cl, 12.8; S, 11.3.

Similarly, 2,4-diamino-5-(N,[4-(dihexylamino)butyl]sulfanilyl)pyrimidine is also produced.

EXAMPLE XV

To a stirring solution of 0.45 g. of potassium ethoxide in 30 ml. of absolute ethanol, there is added 1.5 g. of guanidine hydrochloride followed by 4.2 g. of 2-(p-bromophenylsulfonyl)-3-ethoxy-2-heptenenitrile. The reacting mixture is heated to 50° C. for twenty-four hours and then filtered under suction. After washing with 75 ml. of water, the residue is recrystallized from dimethylformamide to yield 2,4-diamino-5-(p-bromophenylsulfonyl)-6-butylpyrimidine.

Similarly, 2,4-diamino-6-amyl - 5 - (m-iodophenylsulfonyl)pyrimidine and 2,4-diamino-5-(p-ethoxyphenylsulfonyl)-6-heptylpyrimidine are produced.

EXAMPLE XVI

In a 100 ml. flask equipped with a magnetic stirrer and distillation head there are placed 10.8 g. of p-chlorophenylsulfonylacetonitrile, 28.2 g. of triethyl orthopropionate and 2 ml. of glacial acetic acid. The reaction mixture is heated to 145–150° C. for 30 minutes, during which time 16 ml. of distillate is collected. The excess triethyl orthopropionate is removed on the rotary evaporator, in vacuo and the residual oil which recrystallizes, on cooling, giving 26 g. of an oily solid. This material is washed with petroleum ether and filtered, affording 14.2 g. of product, M.P. 74–80° C. which when recrystallized from methanol affords 2-(p-chlorophenylsulfonyl)-3-ethoxy-2-pentenenitrile, M.P. 106.5–108° C.

*Analysis.*—Calcd. for $C_{13}H_{14}NSO_3Cl$ (percent): C, 52.08 H, 4.67; N, 4.67; Cl, 11.83; S, 10.70. Found (percent): C, 51.87; H, 4.54; N, 4.79; Cl, 11.9; S, 10.4.

To a stirring solution of 0.46 g. of sodium metal in 40 ml. of absolute ethanol, there is added 1.44 g. of guanidine hydrochloride followed by 4.5 g. of the above prepared 2-(p-chlorophenylsulfonyl) - 3 - ethoxy-2-pentenenitrile. The reaction mixture is heated under reflux for 1½ hours and then cooled. The 2.0 g. of resulting precipitate is filtered and washed with 30 ml. of water. The remaining water insoluble product amounts to 0.85 g., M.P. 177–179° C., which when recrystallized from benzene yields 0.5 g. of 2,4-diamino-5-(p-chlorophenylsulfonyl)-6-ethylpyrimidine, M.P. 174–176° C.

*Analysis.*—Calcd. for $C_{12}H_{13}N_4SO_2Cl$ (percent): C, 46.08; H, 4.19; N, 17.91; Cl, 11.34; S, 10.25. Found (percent): C, 45.97; H, 4.16; N, 18.21 Cl, 11.7; S, 10.3.

EXAMPLE XVII

A mixture of 2.84 g. of 2,4-diamino-5-(p-chlorophenylsulfonyl)-6-pyrimidine, prepared as in Example XIV, and 19 ml. of acetic anhydride is heated under reflux for two hours. The reaction mixture is then cooled, whereupon 2.95 of a crystalline solid precipitates, M.P. 218–220° C. Upon recrystallization from aqueous ethoxyethanol, there is obtained 2.0 g. of 2,4-diacetamido-5-(p-chlorophenylsulfonyl)pyrimidine, M.P. 219–220° C.

*Analysis.*—Calcd. for $C_{14}H_{13}N_4SO_4Cl$ (percent): C, 45.59 H, 3.55; N, 15.19; Cl, 9.61; S, 8.69. Found (percent): C, 45.57; H, 3.76; N, 15.38; Cl, 9.7; S, 8.6.

In a similar manner, 2,4-diamino-5-(N-[3-(dimethylamino)propyl]sulfanilyl)pyrimidine, as prepared in Example XIII is reacted with acetic anhydride to afford 2,4-diacetamido - 5-(N-[3-(dimethylamino)propyl]sulfanilyl)pyrimidine.

EXAMPLE XVIII

A mixture of 3.0 g. of 2,4-diamino-5-(p-chlorophenylsulfonyl)-6-ethylpyrimidine, prepared as in Example XVI, and 20 ml. of acetic anhydride is heated under reflux for three hours. Thereafter, the reacting mixture is cooled and the resulting precipitate recrystallized from aqueous methoxymethanol to afford 2,4-diacetamido-5-(p-chlorophenylsulfonyl)-6-ethylpyrimidine.

In a similar manner, 2,4-diamino-5-(p-bromophenylsulfonyl)-6-butylpyrimidine, as prepared in Example XV, is reacted with acetic anhydride to yield 2,4-diacetamido-5-(p-bromophenylsulfonyl)-6-butylpyrididine.

EXAMPLE XIX

A mixture of 6.0 g. of 2,4-diamino-5-phenylsulfonylpyrimidine, prepared as in hereinafter Example XX, and 40 ml. of acetic anhydride is heated under reflux for two hours. Thereafter, the reaction mixture is cooled and the resulting precipitate recrystallized from aqueous ethoxyethanol to afford 2,4-diacetamido-5-phenylsulfonylpyrimidine.

Similarly, 2,4-diamino-6-amyl-5- (m-iodophenylsulfonyl)pyrimidine is reacted with acetic anhydride to yield 2,4 - diacetamido - 6 - amyl - 5 - (m-iodophenylsulfonyl)pyrimidine.

EXAMPLE XX

A mixture of 17.2 g. of phenylsulfonylacetonitrile, 44.5 g. of triethyl orthoformate and 1 ml. of glacial acetic acid is heated to 160° C. The ethanol (15 ml.) formed in the reaction is distilled out of the reaction mixture and the excess triethyl orthoformate is removed in vacuo on a rotary evaporator leaving an oily residue. On cooling this oily material, there is obtained a semi-crystalline product which is triturated with cyclohexane and then filtered under suction to afford 21.7 g. of product. Upon recrystallization from ether, there is obtained 3-ethoxy-2-phenylsulfonylacrylonitrile, M.P. 73–74° C.

*Analysis.*—Calcd. for $C_{11}H_{11}NSO_3$ (percent): C, 55.68; H, 4.67; N, 5.90; S, 13.51. Found (percent): C, 55.74; H, 4.68; N, 6.11; S, 13.0.

To a stirring solution of 0.8 g. of sodium in 30 ml. of absolute ethanol, there are added 1.8 g. of guanidine hydrochloride and 3.9 g. of the above prepared 3-ethoxy-2-phenylsulfonylacrylonitrile. The reaction mixture is heated under reflux for one hour and upon cooling the reaction mixture in ice, a crystalline product (4.6 g.) is obtained, M.P. 303–305° C. This material is washed with 75 ml. of water and recrystallized from aqueous 2-ethoxyethanol to afford 2.7 g. of 2,4-diamino-5-phenylsulfonylpyrimidine, M.P. 304–306° C.

*Analysis.*—Calcd. for $C_{10}H_{10}N_4SO_2$ (percent): C, 47.99; H, 4.03; N, 22.39; S, 12.81. Found (percent): C, 48.10; H, 4.19; N, 22.21; S, 12.9.

EXAMPLE XXI

To a stirring solution of 17.2 g. of sodium metal in 600 ml. of absolute ethanol, there is added 93.2 g. of p-toluenethiol. The reaction mixture is cooled to 0° C. and 56.6 of chloroacetonitrile is added dropwise over the course of one hour. The reaction mixture is then filtered and the solvent removed from the filtrate by evaporation. The 94.5 g. of oil residue is p-tolylthioacetonitrile, B.P. 91–93° C. (0.1 mm.).

*Analysis.*—Calcd. for $C_9H_9SN$ (percent): C, 66.24; H, 5.56; N, 8.58; S, 19.61. Found (percent): C, 66.20, H, 5.45; N, 8.48; S, 19.3.

To 30 g. of the above prepared p-tolylthioacetonitrile in 60 g. of glacial acetic acid, there is added 55 ml. of a 35 percent hydrogen peroxide solution. The reaction mixture is then heated at 110° C. for one hour. Thereafter, cold water is added to the reaction mixture until precipitation is complete. The product is separated by filtration and recrystallized from ether to yield p-tolylsulfonylacetonitrile.

A mixture of of 61 g. of p-tolylsulfonylacetonitrile, 148.2 g. triethylformate and 3 ml. of glacial acetic acid is heated to 150–160° C. for four hours. The distillate which is collected amounts to 47 ml. and the excess triethyl orthoformate is removed in vacuo on a rotary evaporator. The residual oil solidifies on standing giving 78 g. of product, M.P. 97–100° C. When this product is recrystallized from methanol, there is obtained 3-ethoxy-2-(p-tolylsulfonyl)acrylonitrile, M.P. 109–112° C.

*Analysis.*—Calcd. for $C_{12}H_{13}NSO_3$ (percent): C, 57.37; H, 5.22; N, 5.58; S, 12.74. Found (percent): C, 57.19; H, 4.92; N, 5.65; S, 12.8.

To a stirred solution of 0.51 g. of sodium metal in 30 ml. of absolute ethanol, there is added 2.1 g. of formamidine acetate followed by 5.03 g. of the above prepared 3 - ethoxy - 2 - (p-tolylsulfonyl)acrylonitrile. The reaction mixture is then heated under reflux for three hours and thereafter, cooled in ice. The precipitated crystals are separated and washed with 50 ml. of water to remove sodium chloride. The product then weighs 3.4 g., M.P. 169–170° C. which when recrystallized from aqueous ethanol affords 2.4 g. of 4-amino-5-(p-tolylsulfonyl)pyrimidine, 170–171.5° C.

*Analysis.*—Calcd. for $C_{11}H_{11}N_3SO_2$ (percent): C, 53.00; H, 4.46; N, 16.86; S, 12.86. Found (percent): C, 53.02; H, 4.39; N, 16.87; S, 12.6.

EXAMPLE XXII

A mixture of 61 g. of p-tolylsulfonylacetonitrile, 148.2 g. triethylformate and 3 ml. of glacial acetic acid is heated to 155° C. for four hours. The distillate which is collected amounts of 47 ml. and the excess triethyl orthoformate is removed under vacuum on a rotary evaporator. The residual oil solidifies on standing yields 78 g. of product, M.P. 97–100° C., which when recrystallized from methanol affords 3 - ethoxy - 2 - (p-tolylsulfonyl)acrylonitrile, M.P. 109–112° C.

*Analysis.*—Calcd. for $C_{12}H_{13}NSO_3$ (percent): C, 57.37; H, 5.22; N, 5.58; S, 12.74. Found (percent): C, 57.19; H, 4.92; N, 5.65; S, 12.8.

To a stirring solution of 0.53 g. of sodium in 40 ml. of absolute ethanol, there is added 3.14 g. of benzamidine hydrochloride followed by 5.0 g. of 3-ethoxy-2-(p-tolylsulfonyl)acrylonitrile. The reaction mixture is heated under reflux for two hours and then cooled. The crystalline product which precipitates amounts to 6.05 g., M.P. 176–178° C. After washing the product with water, the remaining solid weighs 4.85 g., M.P. 181–183° C. which when recrystallized from ethanol affords 4.3 g. of 4-amino-2-phenyl-5-(p-tolylsulfonyl)pyrimidine, M.P. 180–181° C.

*Analysis.*—Calcd. for $C_{17}H_{15}N_3SO_2$ (percent): C, 62.75; H, 4.63; N, 12.92; S, 9.85. Found (percent): C, 62.45; H, 4.37; N, 12.96; S, 9.9.

In a similar manner, 4-amino-2-(p-butoxyphenyl)-5-(p-tolylsulfonyl)pyrimidine is synthesized.

EXAMPLE XXIII

To a stirring solution of 0.9 g. of potassium in 150 ml. of absolute ethanol, there is added 8.7 g. of S-ethylisothiourea hydrochloride followed by 10.0 g. of 3-ethoxy-2-(p-ethylphenylsulfonyl)-acrylonitrile. The reacting mixture is heated to 75° C. for fifteen hours, and then cooled to room temperature. The resulting precipitate is filtered, washed with water and recrystallized from benzene to afford 4-amino-2-ethylmercapto-5-(p-ethylphenylsulfonyl) pyrimidine.

EXAMPLE XXIV

To a stirring solution of 1.8 g. of potassium ethoxide in 300 ml. of absolute ethanol, there is added 17.4 g. of S-butylisothiourea hydrobromide followed by 20.0 g. of 3-ethoxy-2 - (m-methoxyphenylsulfonyl)acrylonitrile. The reaction mixture is heated to 65° C. for eighteen hours, and then cooled. The resulting precipitate is filtered, washed with water and recrystallized from toluene to afford 4-amino-2-butylmercapto - 5 - (m-methoxyphenylsulfonyl)pyrimidine.

In a similar manner, 4-amino-6-hexyl-2-methylmercapto-5-phenylsulfonylpyrimidine is synthesized.

EXAMPLE XXV

To a stirring solution of 0.43 g. of sodium in 75 ml. of absolute ethanol, there is added 4.36 g. of S-methylisothiourea hydroiodide followed by 5.0 g. of 3-ethoxy-2-(p-tolylsulfonyl)acrylonitrile, which is prepared as in Example XII. The reaction mixture is heated under reflux for 2.5 hours and then allowed to stand overnight, during which time 2.35 g. of crystals deposit, M.P. 175–177° C. This material is washed with water to remove sodium chloride. Recrystallization of the remaining solid from benzene yields 2.1 g. of 4-amino-2-methylmercapto-5-(p-tolylsulfonyl)pyrimidine, M.P. 178–179° C.

*Analysis.*—Calcd. for $C_{12}H_{13}N_3S_2O_2$ (percent): C, 48.80; H, 4.40; N, 14.22; S, 21.71. Found (percent): C, 48.74; H, 4.38; N, 13.96; S, 21.1.

EXAMPLE XXVI

To a stirring solution of 0.39 g. of sodium metal in 30 ml. of absolute ethanol, there is added 1.43 g. of guanidine hydrochloride followed by 3.8 of 3-ethoxy-2-(p-tolylsulfonyl)acrylonitrile. The reaction mixture is heated under reflux for four hours and then cooled in ice. Filtration of the reaction mixture affords 4.4 g. of product, M.P. 285–289° C. which is then washed with 75 ml. of water to remove sodium chloride. The residual solid is recrystallized from aqueous dimethylsulfoxide to afford 2,4-diamino-5-(p-tolylsulfonyl)pyrimidine, 285–287° C.

*Analysis.*—Calcd. for $C_{11}H_{12}N_4SO_2$ (percent): C, 49.99; H, 4.58; N, 21.19; S, 12.13. Found (percent): C, 50.07; H, 4.54; N, 20.96; S, 11.66.

EXAMPLE XXVII

A mixture of 6.3 g. of 3-ethoxy-2-(m-tolylsulfonyl) acrylonitrile, as prepared in Example I, and 2.25 g. of guanidine carbonate, in 40 ml. of absolute ethanol, is heated under reflux for 3.5 hours. The reaction mixture is then cooled in ice and the crystalline product which precipitates amounts to 3.25g., M.P. 250–251° C. Two recrystallizations of the product from aqueous N,N-dimethylformamide affords 2.0 g. of 2,4-diamino-5-(m-tolylsulfonyl)pyrimidine, M.P. 254–255° C.

*Analysis.*—Calcd. for $C_{11}H_{12}N_4SO_2$ (percent): C, 49.99; H, 4.58; N, 21.19; S, 12.13. Found (percent): C, 49,83; H, 4.53; N, 21.32; S, 12.4.

EXAMPLE XXVIII

To a stirring solution of 6.27 g. of sodium metal in 400 ml. of absolute ethanol, there is added 43.7 g. of 2-naphthalenethiol. The reaction mixture is cooled to 0° C., and 21.0 g. of chloroacetonitrile is added dropwise over the course of one hour. The temperature of the reaction mixture is allowed to rise to room temperature, with stirring, and remain at this temperature for twelve hours. The mixture is filtered under suction, washed with 200 ml. of water and recrystallized from ethanol to afford 2-naphthylthioacetonitrile, M.P. 83–84° C.

*Analysis.*—Calcd. for $C_{12}H_9SN$ (percent): C, 72.35; H, 4.55; N, 7.03; S, 16.06. Found (percent): C, 72.45; H, 4.55; N, 6.97; S, 15.72.

To 30 g. of the above prepared 2-napthylthioacetonitrile in 60 g. of glacial acetic acid, there is added 55 ml. of a 30 percent hydrogen peroxide. The reaction mixture is then heated at 100° C. for one hour and then cooled. Cold water is added to the reaction mixture until precipitation is complete. Thereafter, the product is separated by filtration and recrystallized from ether to yield 2-naphthylsulfonylacetonitrile.

A mixture of 39.9 g. of the above prepared 2-naphthylsulfonylacetonitrile, 92 g. of triethyl orthoformate and 3 ml. of glacial acetic acid is heated to 150–160° C. for four hours.

The distillate B.P. 70–85° C. amounts to 31 ml., the excess triethyl orthorformate is removed on a rotary evaporator in vacuo and the residual solid amounts to 42.1 g., M.P. 132–133.5° C. Upon recrystallization of the residual solid from ethanol, there is obtained 3-ethoxy-2-(2-naphthylsulfonyl)acrylonitrile, M.P. 132–133° C.

*Analysis.*—Calcd. from $C_{15}H_{13}NSO_3$ (percent): C, 62.71; H, 4.56; N, 4.88; S, 11.14. Found (percent): C, 62.67; H, 4.77; N, 4.83; S, 10.8.

To a stirring solution of 0.51 g. of sodium in 50 ml. of absolute ethanol, there is added 2.08 g. of formamidine acetate followed by 5.75 g. of the above prepared 3-ethoxy-2-(2-naphthylsulfonylacrylonitrile. The reaction mixture is heated under reflux for one hour, then cooled and filtered. The product amounts to 4.9 g., M.P. 230–240° C., which is thoroughly washed with water and recrystallized from ethanol to yield 4-amino-5-(2-naphthylsulfonyl)pyrimidine, M.P. 206–208° C.

*Analysis.*—Calcd. for $C_{14}H_{11}N_3SO_2$ (percent): C, 58.93; H, 3.89; N, 14.73; S, 11.24. Found (percent): C, 58.66; H, 3.92; N, 15.04; S, 10.7.

In a similar manner, 4-amino-5-(4-chloro-2-naphthylsulfonyl)pyrimidine, 4-amino-5-(6-methyl - 2 - naphthylsulfonyl)pyrimidine and 4-amino-6-ethyl-5-(4-heptoxy-2-naphthylsulfonyl)pyrimidine are synthesized.

EXAMPLE XXIX

To a stirring solution of 0.42 g. of potassium metal in 40 ml. of absolute propanol, there is added 2.4 g. of p-chlorobenzamidine hydrochloride followed by 4.5 g. of 3-ethoxy - 2 - (4-propyl-2-naphthylsulfonyl)acrylonitrile and the mixture is heated to 75° C. for four hours. Thereafter, the reaction mixture is cooled and filtered. The solid product is then washed with water and recrystallized from propanol to afford 4-amino-2-(p-chlorophenyl)-5-(4-propyl-2-naphthylsulfonyl)pyrimidine.

Similarly, 4 - amino - 5-(6-amyl-2-naphthylsulfonyl)-2-(p-bromophenyl)pyrimidine; 4-amino-5-(8-fluoro-2-naphthylsulfonyl)-2-(p-iodophenyl)-6-methylpyrimidine and 4-amino - 5 - (4-bromo-2-naphthylsulfonyl)-2-phenyl-6-propylpyrimidine are produced.

EXAMPLE XXX

To a stirring solution of 0.39 g. of sodium metal in 30 ml. of absolute ethanol, there is added 2.35 g. of benzamidine hydrochloride followed by 4.3 g. of 3-ethoxy-2-(2-naphthylsulfonyl)acrylonitrile, prepared as in Example XXVIII. The reaction mixture is heated under reflux for 1½ hours, cooled and filtered to afford 5.1 g. of material, M.P. 190–193° C. This product is washed with 40 ml. of water and recrystallized from ethanol to yield 4-amino-5-(2 - naphthylsulfonyl) - 2 - phenylpyrimidine, M.P. 193–194° C.

*Analysis.*—Calcd. for $C_{20}H_{15}N_3SO_2$ (percent): C, 66,46; H, 4.18; N, 11.63; S, 8.87. Found (percent): C, 66.39; H, 4.10; N, 11.72; S, 8.7

In the same manner, 4-amino-5-(4-iodo-2-naphthylsulfonyl)-2-phenylpyrimidine and 4-methyl-5-(2-naphthylsulfonyl)-2-phenylpyrimidine are synthesized.

EXAMPLE XXXI

To a stirring solution of 1.0 g. of potassium metal in 50 ml. of absolute methanol, there is added 2.5 g. of guanidine hydrochloride and 5.8 g. of 3-ethoxy-2-(4-methoxy-2-naphthylsulfonyl)acrylonitrile. The reaction mixture is heated to 60° C. for five hours, cooled in ice and filtered under suction. The solid product is recrystallized from Cellosolve to afford 2,4-diamino-5-(4-methoxy-2-naphthylsulfonyl)pyrimidine.

In a similar manner, guanidine hydrochloride and 3-ethoxy - 2 - (6-ethoxy-2-naphthylsulfonyl)acrylonitrile are reacted to produce 2,4-diamino-5-(6-ethoxy-2-naphthylsulfonyl)pyrimidine.

EXAMPLE XXXII

To a stirring solution of 0.97 g. of sodium metal in 40 ml. of absolute ethanol, there is added 2.2 g. of guanidine hydrochloride and 5.75 g. of 3-ethoxy-2-(2-naphthylsulfonyl)acrylonitrile. The reaction mixture is heated under reflux for one hour, then cooled in ice and filtered. The resulting brown solid amounts to 6.9 g., M.P. 305–310° C. decomp. which when recrystallized from aqueous Cellosolve with decolorizing charcoal affords 3.0 g. of 2,4-diamino - 5 - (2 - naphthylsulfonyl)pyrimidine, M.P. 306–307° C.

*Analysis.*—Calcd. for $C_{14}H_{12}N_4SO$ (percent): C, 55.99; H, 4.03; N, 18.66; S, 10.68. Found (percent): C, 56.25; H, 4.31; N, 18.82; S, 10.6.

EXAMPLE XXXIII

To a stirring solution of 4.6 g. of sodium metal in 200 ml. of absolute ethanol, there is added 25.6 g. of p-fluorobenzenethiol. The reaction mixture is cooled to 0° C., and 15.1 g. chloroacetonitrile is added dropwise over the course of ½ hour. The temperature of the reaction mixture is then raised to room temperature and the mixture is stirred for twelve hours. The mixture is then filtered and the solvent removed from the filtrate by rotary evaporation under vacuum. The resulting oily residue crystallizes on cooling giving 33.4 g. of product, M.P. 34–38° C. which then recrystallized from petroleum ether affords p-fluorophenylthioacetonitrile, M.P. 34–35° C.

*Analysis.*—Calcd. for $C_8H_6NSF$ (percent): C, 57.46; H, 3.62; N, 8.38; F, 11.36; S, 19.18. Found (percent): C, 57.76; H, 3.57; N, 8.59; F, 11.0; S, 19.2.

To 32 g. of the above prepared p-fluorophenylthioacetonitrile in 57.5 g. of glacial acetic acid there is added 55 ml. of a 30 percent hydrogen peroxide solution. The reaction mixture is heated on the steam-bath for one hour and then cooled. Thereafter, cold water is added to the reaction mixture until precipitation is complete. Filtration under suction affords 40 g. of product, M.P. 88.5–89.5° C., which when recrystallized from an ether/petroleum ether mixture yields p-fluorophenylsulfonylacetonitrile, M.P. 90–91° C.

*Analysis.*—Calcd. for $C_8H_6NSO_2F$ (percent): C, 48.23; H, 3.04; N, 7.03; F, 9.54; S, 16.10. Found (percent: C, 48.31; H, 2.95; N, 7.04; F, 9.1; S, 16.0.

A mixture of 26.0 g. of p-fluorophenylsulfonylacetonitrile, 60 g. of triethyl orthoformate and 3 ml. of glacial acetic acid is heated under reflux for five hours. The ethanol formed in the reaction is removed by distillation, a total of 22 ml. of distillate, B.P. 75–80° C. is collected, and the excess triethyl orthoformate is removed under vacuum on a rotary evaporator. The residual solid amounts to 32.2 g., M.P. 101–106° C., which upon recrystallization from ethanol yields 3-ethoxy-2-(p-fluorophenylsulfonyl)acrylonitrile, M.P. 105–106° C.

*Analysis.*—Calcd. for $C_{11}H_{10}NSO_3F$ (percent): C, 51.76; H, 3.95; N, 5.49; F, 7.44; S, 12.56. Found (percent): C, 52.02; H, 4.04; N, 5.51; F, 6.95; S, 12.3

To a suspension of 2.1 g. of guanidine carbonate in 50 ml. of absolute ethanol, there is added 7.65 g. of the above prepared 3 - ethoxy - 2 - (p-fluorophenylsulfonyl)acrylonitrile. The reaction mixture is heated under reflux for five hours, cooled and then filtered to yield 4 g. of solid product, M.P. 232–234° C. Recrystallization from ethanol affords 2,4 - diamino-5-(p-fluorophenylsulfonyl) pyrimidine, M.P. 233–235° C.

*Analysis.*—Calcd. for $C_{10}H_9N_4SO_2F$ (percent): C, 44.77; H, 3.38; N, 20.89; F, 7.08; S, 11.95. Found (percent): C, 44.76; H, 3.11; N, 20.63; F, 6.5; S, 11.5.

In a similar manner, 2,4-diamino-6-ethyl-5-(p-fluorophenylsulfonyl)pyrimidine and 2,4-diamino-5-(p-fluorophenylsulfonyl)-6-octylpyrimidine are produced.

EXAMPLE XXXIV

To a solution of 0.46 g. of sodium in 50 ml. of absolute ethanol, there is added 1.8 g. of 2,4-diamino-5-(p-fluorophenylsulfonyl)pyrimidine, as prepared in Example XXXIII. The reaction mixture is heated under reflux with stirring for one hour and then allowed to stand for twelve hours at room temperature. After cooling in ice, the reaction mixture is filtered under suction affording 1.9 g. of solid product, M.P. 258–259° C. which when recrystallized from ethanol yields 2,4-diamino-5-(p-ethoxyphenylsulfonyl)pyrimidine, M.P. 261–262° C.

*Analysis.*—Calcd. for $C_{12}H_{14}N_4SO_3$ (percent): C, 48.97; H, 4.79; N, 19.04; S, 10.89. Found (percent): C, 48.74; H, 4.50; N, 18.77; S, 11.1.

In a similar manner, 2,4-diamino-5-(o-propoxyphenylsulfonyl)pyrimidine is produced.

EXAMPLE XXXV

A solution of 1.5 g. of 2,4-diamino-5-(p-fluorophenylsulfonyl)pyrimidine and 11.0 g. of piperidine are heated under reflux for four hours. The excess piperidine is then removed by in vacuo evaporation and the residual product washed with 30 ml. of water. The product is filtered and recrystallized from methanol to afford 2,4-diamino-5-[p-(1-piperidyl)phenylsulfonyl]pyrimidine.

EXAMPLE XXXVI

A solution of 3.0 g. of 2,4-diamino-5-(p-fluorophenylsulfonyl)pyrimidine and 22.0 g. of N-methylpiperazine are heated under reflux for 6½ hours. Thereafter, the excess N-methylpiperazine is removed under vacuum on a rotary evaporator and the residual oily solid is washed with 50 ml. of water. Filtration under suction affords 3.8 g. of product, M.P. 245–249° C. which when recrystallized from ethanol yields 2,4-diamino-5-[p-(4-methyl-1-piperazinyl)phenylsulfonyl]pyrimidine, M.P. 245–247° C.

*Analysis.*—Calcd. for $C_{15}H_{20}N_6SO_2$ (percent): C, 51.71; H, 5.79; N, 24.12; S, 9.20. Found (percent): C, 51.65; H, 5.71; N, 23.90; S, 9.4.

In a similar manner, 2-amino-6-ethyl-5-(p-fluorophenylsulfonyl)-4-(p-tolyl)pyrimidine is reacted with N-butylpiperazine to produce 2-amino-5-[p-(4-butyl-1-piperazinyl)phenylsulfonyl]-6-ethyl-4-(p-tolyl)pyrimidine.

EXAMPLE XXXVII

A solution of 6.0 g. of 4-amino-2-ethyl-5-(p-fluorophenylsulfonyl)pyrimidine and 45.0 g. of N-ethylpiperazine is heated under reflux for seven hours. Thereafter, the excess N-ethylpiperazine is removed by evaporation under vacuum and the residual solid is washed with 150 ml. of water. The remaining solid product is then filtered and recrystallized from propanol to obtain 4-amino-2-ethyl - 5 - [p - (4 - ethyl-1-piperazinyl)phenylsulfonyl] pyrimidine.

Similarly, 2,4 - diamino - 5 - [p - (4-propyl-1-piperazinyl)phenylsulfonyl]pyrimidine is synthesized.

EXAMPLE XXXVIII

A solution of 3.0 g. of 2,4-diamino-5-(p-fluorophenylsulfonyl)pyrimidine and 11.6 g. of N,N-diethylethylenediamine is heated under reflux for 6½ hours. Thereafter the excess N,N-diethylethylenediamine is removed on a rotary evaporator and the residual oily solid is washed with 50 ml. of water. Filtration under suction affords 4.4 g. of product, M.P. 165–175° C. which upon recrystallization from ethanol affords 2,4-diamino-5-(N-[2-(diethylamino)ethyl]sulfanilyl)pyrimidine, M.P. 173–174° C.

*Analysis.*—Calcd. for $C_{16}H_{24}N_6SO_2$ (percent): C, 52.72; H, 6.64; N, 23.06; S, 8.80. Found (percent): C, 52.47; H, 6.42; N, 2.8; S, 8.8.

In a similar manner, 2,4 - diamino - 5 - (N - [6 - (diethylamino)hexyl]sulfanilyl)pyrimidine and 2,4-diamino-5 - (N - [2 - (dibutylamino)ethyl]sulfanilyl)pyrimidine are produced.

EXAMPLE XXXIX

A solution of 1.0 g. of 2,4-diamino-5-(p-fluorophenylsulfonyl)pyrimidine and 4.0 g. of methylamine is heated under reflux for ten hours. Thereafter, the excess methylamine is removed by evaporation and the residual solid washed with 25 ml. of water. The product is then filtered and recrystallized from ethanol to afford 2,4-diamino-5-(N-methylsulfanilyl)pyrimidine.

In a similar manner, 2,4-diamino-5-(N,N-diamylsulfanilyl) pyrimidine is produced.

EXAMPLE XL

A mixture of 9.55 g. of 2-(p-acetamidophenylsulfonyl) acetonitrile, 38 g. of triethyl orthoformate and 4.2 g. of acetic anhydride is heated to 150–160° C. for three hours. The distillate which is collected amounts to 4 ml. B.P. 70–110° C. The reaction mixture is then cooled and filtered under suction. The collected solid amounts to 7.4 g., M.P. 191–193° C. which is recrystallized from ethanol to afford N-[p-(1-cyano-2-ethoxyvinylsulfonyl)phenyl]acetamide, M.P. 197.5–199° C.

*Analysis.*—Calcd. for $C_{13}H_{14}N_2SO_4$ (percent): C, 53.06; H, 4.80; N, 9.52; S, 10.87. Found (percent): C, 53.12; H, 4.88; N, 9.64; S, 11.0.

To a stirring solution of 0.97 g. of sodium metal in 30 ml. of absolute ethanol, there are added 5.9 g. of the above prepared N - [p - (1 - cyano - 2 - ethoxyvinylsulfonyl)phenyl]acetamide and 2.18 g. of guanidine hydrochloride. The reaction mixture is heated under reflux for two hours and then cooled at 5° C. for twelve hours. Upon filtration under suction, there is obtained 3.2 g. of product, M.P. 264–268° C. which is washed with 15 ml. of water and then recrystallized from aqueous-N,N-dimethylformamide. In this manner, is obtained 1.1 g. of 4-(2,4-diamino - 5 - pyrimidinesulfonyl)acetanilide, M.P. 283–284° C.

*Analysis.*—Calcd. for $C_{12}H_{13}N_5SO_3$ (percent): C, 46.90; H, 4.26; N, 22.79; S, 10.43. Found (percent): C, 47.01; H, 4.54; N, 22.77; S, 10.0.

EXAMPLE XLI

A suspension of 0.35 g. of 4 - (2,4 - diamino - 5 - pyrimidinylsulfonyl)acetanilide, as prepared in Example XL, in 37.5 ml. of concentrated hydrochloric acid and 50 ml. of ethanol is heated under reflux for four hours, then cooled and filtered. The resulting precipitate amounts to 0.4 g., M.P. 283–285° C. decomp., which is then suspended in 20 ml. of concentrated ammonium hydroxide, heated for ten minutes on a steam bath and filtered to afford 0.2 g. of 2,4 - diamino - 5 - sulfanilylpyrimidine, M.P. 260–261° C.

*Analysis.*—Calcd. for $C_{10}H_{11}N_2SO_5$ (percent): C, 45.27; H, 4.18; N, 26.40; S, 12.09. Found (percent): C, 45.31; H, 4.03; N, 26.32; S, 11.9.

EXAMPLE XLII

A mixture of 9.55 g. of 2 - (4 - acetamidophenylsulfonyl)acetonitrile, 38 g. of triethyl orthoformate and 4.2 g. of acetic anhydride is heated to 150–160° C. for three hours. The distillate which is collected amounts to 4 ml., B.P. 70–110° C. The reaction mixture is then cooled and filtered under suction. The solid which is obtained amounts to 7.4 g. M.P. 191–193° C. which is recrystallized from ethanol to afford N - [p - (1 - cyano - 2 - ethoxyvinylsulfonyl)phenyl]acetamide, M.P. 197.5–199° C.

*Analysis.*—Calcd. for $C_{13}H_{14}N_2SO_4$ (percent): C, 53.06; H, 4.80; N, 9.52; S, 10.87. Found (percent): C, 53.12; H, 4.88; N, 9.64; S, 11.0.

To a solution of 0.99 g. of sodium metal in 80 ml. of absolute ethanol, there is added 5.95 g. of benzamidine hydrochloride followed by 11.2 g. of N - [p - (1 - cyano-2 - ethoxyvinylsulfonyl)phenyl]acetamide. The reaction mixture is heated under reflux for 1½ hours and then cooled at 5° C. for twelve hours. Filtration under suction affords 8.3 g. of a solid which is washed with 50 ml. of water, followed by 50 ml. of petroleum ether. The remaining solid amounts to 5.7 g., M.P. 239–241° C. which when recrystallized from aqueous ethanol affords 4 - (4 - amino - 2 - phenyl - 5 - pyrimidinylsulfonyl) acetanilide, M.P. 251–252° C.

*Analysis.*—Calcd. for $C_{18}H_{16}N_4SO_3$ (percent): C, 58.88; H, 4.32; N, 17.17; S, 9.82. Found (percent): C, 58.43; H, 4.18; N, 15.4; S, 8.7.

EXAMPLE XLIII

A stirring suspension of 5.2 g. of 4 - (4 - amino - 2 - phenyl - 5 - pyrimidinylsulfonyl)acetanilide in 23 ml. of concentrated hydrochloric acid and 100 ml. of ethanol is heated under reflux for four hours, then cooled in ice and filtered under suction. There is obtained 5.5 g. of solid, M.P. 190–200° C. decomp., which is triturated with a solution of 10 g. of sodium bicarbonate dissolved in 150 ml. of water. Thereafter, the resulting suspension is filtered and washed with water and petroleum ether. In this manner, is obtained 4.0 g. of product, M.P. 204–208° C. which when recrystallized from aqueous-acetone affords 2.2 g. of 4 - amino - 2 - phenyl - 5 - sulfanylylpyrimidine, M.P., 208–210° C.

*Analysis.*—Calcd. for $C_{16}H_{14}N_4SO_2$ (percent): C, 58.88; H, 4.32; N, 17.17; S, 9.82. Found (percent): C, 59.19; H, 4.32; N, 17.14; S, 9.7.

EXAMPLE XLIV

To a stirring solution of 1.06 g. of sodium metal in 80 ml. of ethanol, there is added 4.2 g. of formamidine acetate followed by 10.0 g. of 3 - ethoxy - 2 - (3 - tolylsulfonyl)acrylonitrile. The reaction mixture is heated under reflux for three hours and then cooled in ice. Filtration affords 7.5 g. of solid, M.P. 160° C. which after washing with water yields 5.7 g. of product, M.P. 164–166° C. Recrystallization from ethyl acetate-petroleum ether affords 4 - amino - 5 - (m - tolylsulfonyl)pyrimidine, M.P. 168–166° C. Recrystallization from ethyl acetate-petroleum ether affords 4 - amino - 5 - (m - tolylsulfonyl)pyrimidine, M.P. 168–170° C.

*Analysis.*—Calcd. for $C_{17}H_{15}N_3SO_2$ (percent): C. 53.00; H, 4.46; N, 16.86; S, 12.86. Found (percent): C, 53.24; H, 4.58; N, 16.98; S, 12.6.

EXAMPLE XLV

To a stirring solution of 0.65 g. of sodium metal in 40 ml. of absolute ethanol, there is added 3.74 g. of benzamidine hydrochloride followed by 6.0 g. of 3-ethoxy-2 - (3 - tolylsulfonyl)acrylonitrile. The reaction mixture is heated under reflux for 1¾ hours and then allowed to stand at ambient temperature for twelve hours. Thereafter the reaction mixture is cooled in ice and filtered under suction. The solid amounts to 5.4 g., M.P. 165–172° C. which after washing with water is recrystallized from ethanol to afford 3.3 g. of 4-amino-2-phenyl 5-(m-tolylsulfonyl)pyrimidine, M.P. 167–168° C.

*Analysis.*—Calcd. for $C_{17}H_{15}N_3SO_2$ (percent): C, 62.75; 62.75; H, 4.65; N, 12.92; S, 9.85. Found (percent): C, 62.87; H, 4.46; N, 13.19; S, 9.8.

EXAMPLE XLVI

A mixture of 15.0 g. of ω - (p - bromophenylsulfonyl) acetaphenone, 35 g. of triethyl orthoformate and 2 ml. of glacial acetic acid is heated to 130° C. for four hours. Subsequently, the reaction mixture is cooled in ice and the precipitated solid is recrystallized from methanol to afford 2 - (p - bromophenylsulfonyl) - 3 - ethoxyacrylophenone.

To a stirring solution of 0.5 g. of potassium in 40 ml. of absolute methanol, there are added 1.8 g. of guanidine hydrochloride and 4.6 g. of the above prepared 2-(p-bromophenylsulfonyl) - 3 - ethoxyacrylophenone. The reaction mixture is then refluxed for two hours and cooled. The resulting precipitate is filtered and recrystalized from ethanol to afford 2 - amino - 4 - (p - bromophenyl)- 5-phenylsulfonylpyrimidine.

Similarly, 2 - amino- 5 - phenylsulfonyl - 4 - (p - propylphenyl)pyrimidine; 2 - amino - 6 - ethyl - 4 - (m - iodophenyl) - 5 - phenylsulfonylpyrimidine and 2 - amino- 4 - (p - amylphenyl) - 5 - (p - chlorophenylsulfonyl) pyrimidine are synthesized.

EXAMPLE XLVII

To a stirring solution of 1.0 g. of sodium in 100 ml. of absolute ethanol, there are added 3.8 g. of guanidine hydrochloride and 9.2 g. of 3 - ethoxy - 2 - (m - ethylphenylsulfonyl)acrylophenone. The reaction mixture is then refluxed for three hours, cooled and filtered. Subsequently, the product is recrystallized from ethanol to obtain 2 - amino - 4 - (m - ethylphenyl) - 5 - phenylsulfonylpyrimidine.

In a similar manner, 2 - amino - 4 -(p - fluorophenyl)- 5 - phenylsulfonylpyrimidine and 2 - amino - 4 - (p-butoxyphenyl) - 5 - phenylsulfonylpyrimidine are synthesized.

In evaluating the instant compounds for pharmacological activity, they are tested in vivo by standard methods with the following results.

A dog is anesthetized with Dial-urethane. Blood pressure, respiration, and heart rate are recorded. Responses to epinephrine, norepinephrine, acetylcholine, histamine and DMPP are recorded before and after administration of the test drug. The latter is administerd p.o. at a dose of 20 mg./kg. Response to this dose is observed for a minimum of 2 hours. A drug is considered active if it changes blood pressure by 25 mm. Hg for 30 minutes. Changes in blood pressure of 10–30 mm. Hg are termed slight; changes of 31–60 mm. Hg are termed moderate; and changes of 61 mm. Hg or more are termed marked.

In this test, 4-amino-5-(p-chlorophenylsulfonyl) - 2-phenylpyrimidine caused a marked blood pressure decrease for 2 hours, and was active; and 4-amino-2-methyl-mercapto-5-(p-tolylsulfonyl)pyrimidine caused a slight blood pressure decrease for 60 minutes; it showed mild hypotensive activity.

In a second test of cardiovascular activity, the effect of the compounds on the blood pressure of hypertensive rats is determined.

Male or female rats are rendered hypertensive by applying a figure-of-eight ligature around one kidney and contralateral nephrectomy. Blood pressure tends to stabilize at a hypertensive level after approximately 6 weeks. Systalic pressure is measured by an indirect technique using the Decker caudal plethysmograph. A control group of rats is run with each group treated with drug. Each group usually consists of 6 rats. Drugs are administered by the i.p. route. Pressures are read prior to drug administration and at 2 and 24 hours thereafter. Results are analyzed statistically.

In this test, 4-amino-5-(p-chlorophenylsulfonyl)-2-phenylpyrimidine, at 75 mg./kg., caused a slight blood pressure decrease, and was active; 4-amino-2-methylmercapto-5-(p-tolylsulfonyl)pyrimidine at 60 mg./kg. caused a mild blood pressure decrease; and at 75 mg./kg., caused a slight blood pressure decrease, and was active; 4-amino-5-(β-naphthylsulfonyl)-2-phenylpyrimidine at 75 mg./kg. caused a mild blood pressure decrease; and 4-amino-5-(p-aminophenylsulfonyl)-2-phenylpyrimidine at 100 mg./kg. caused a slight decrease in blood pressure, and was active.

What is claimed is:

1. A compound of the formula:

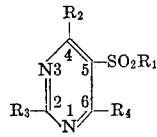

wherein $R_1$ is selected from the group consisting of lower alkylaminophenyl, di(lower)alkylaminophenyl, di(lower)alkylamino(lower)alkylaminophenyl, piperidylphenyl, N-(lower)alkylpiperazinylphenyl, naphthyl, halonaphthyl, lower alkylnaphthyl and lower alkoxynaphthyl; $R_2$ is amino; $R_3$ is selected from the group consisting of amino, acetamido, lower alkyl, lower alkylmercapto, phenyl, halophenyl, lower alkylphenyl and lower alkoxyphenyl; and $R_4$ is selected from the group consisting of hydrogen and lower alkyl.

2. A compound of the formula:

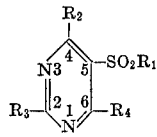

wherein $R_1$ is selected from the group consisting of phenyl, aminophenyl, acetamidophenyl, halophenyl, lower alkylphenyl, lower alkoxyphenyl, lower alkylaminophenyl, di(lower)alkylaminophenyl, di(lower)alkylamino(lower)alkylaminophenyl, piperidylphenyl, N-(lower)alkylpiperazinylphenyl, naphthyl, halonaphthyl, lower alkylnaphthyl and lower alkoxynaphthyl; $R_2$ is selected from the group consisting of acetamido, lower alkyl, phenyl, halophenyl, lower alkylphenyl and lower alkoxyphenyl; $R_3$ is selected from the group consisting of amino, acetamido, lower alkyl, lower alkylmercapto, phenyl, halophenyl, lower alkylphenyl and lower alkoxyphenyl; and $R_4$ is selected from the group consisting of hydrogen and lower alkyl with the provisio that when $R_1$ is selected from the group consisting of aminophenyl and acetamidophenyl, and $R_3$ is selected from the group consisting of amino and lower alkylmercapto, $R_4$ is lower alkyl.

3. A compound of the formula:

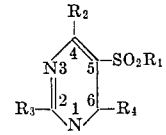

wherein $R_1$ is selected from the group consisting of phenyl, aminophenyl, acetamidophenyl, halophenyl, lower alkylphenyl, lower alkoxyphenyl, lower alkylaminophenyl, di(lower)alkylaminophenyl, di(lower)alylamino(lower)alkylaminophenyl, piperidylphenyl, N-(lower)alkylpiperazinylphenyl, naphthyl, halonaphthyl, lower alkylnaphthyl and lower alkoxynaphthyl; $R_2$ is selected from the group consisting of amino, acetamido, lower alkyl, phenyl, halophenyl, lower alkylphenyl and lower alkoxyphenyl; $R_3$ is hydrogen; and $R_4$ is selected from the group consisting of hydrogen and lower alkyl.

4. A compound as defined in claim 3 which is: 4-amino-5-(p-chlorophenylsulfonyl)pyrimidine.

5. A compound as defined in claim 2 which is: 2-amino-5-(p-chlorophenylsulfonyl)-4-methylpyrimidine.

6. 4-amino-5-(p-chlorophenylsulfonyl)-2-phenylpyrimidine.

7. A compound as defined in claim 1 which is: 4-amino-5-(2-naphthylsulfonyl)-2-phenylpyrimidine.

8. A compound as defined in claim 1 which is: 2,4-diamino - 5 - [p - (4 - methyl - 1 - piperazinyl)phenylsulfonyl]pyrimidine.

References Cited

UNITED STATES PATENTS 3,435,035    2/1964    Habicht et al. _____ 260—256.5

FOREIGN PATENTS 753,176    1960    Great Britain _____ 260—256.5

OTHER REFERENCES

Polonouski et al., Comptes Rendus, vol. 232, pp. 2108–09 (1951).

Brown, Heterocyclic Compounds; The Pyrimidines, p. 299 (Interscience Publ., New York, 1962).

HENRY R. JILES, Primary Examiner

H. I. MOATZ, Assistant Examiner

U.S. Cl. X.R.

260—251, 256.5, 397.6, 465, 559, 592; 424—228, 251

PO-1050
(5/69)

UNITED STATES PATENT OFFICE
CERTIFICATE OF CORRECTION

Patent No. 3,553,198               Dated January 5, 1971

Inventor(s) Arthur A. Santilli, Thomas S. Osdene, Scott J. Childr

It is certified that error appears in the above-identified patent and that said Letters Patent are hereby corrected as shown below:

At column 18, line 7 (Claim 3), the 1-6-double bond has been omitted from the formula which should read:

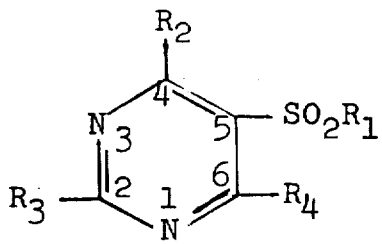

Signed and sealed this 25th day of May 1971.

(SEAL)
Attest:

EDWARD M. FLETCHER, JR.
Attesting Officer

WILLIAM E. SCHUYLER, JR.
Commissioner of Patents